Oct. 22, 1957 J. H. BREMS ET AL 2,810,817
WIRE MESH WELDING MACHINE
Filed Sept. 15, 1955 6 Sheets-Sheet 3
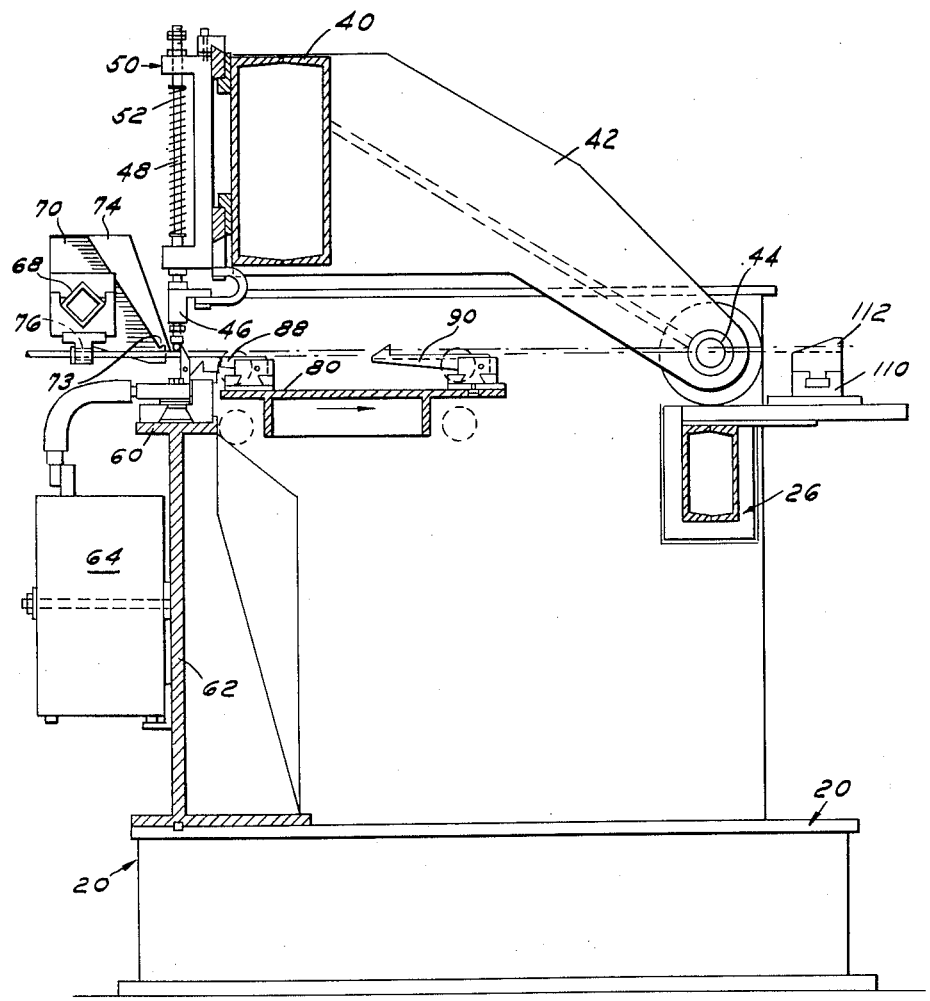
INVENTORS
JOHN H. BREMS
HANS MAREIS
BY
ATTORNEYS

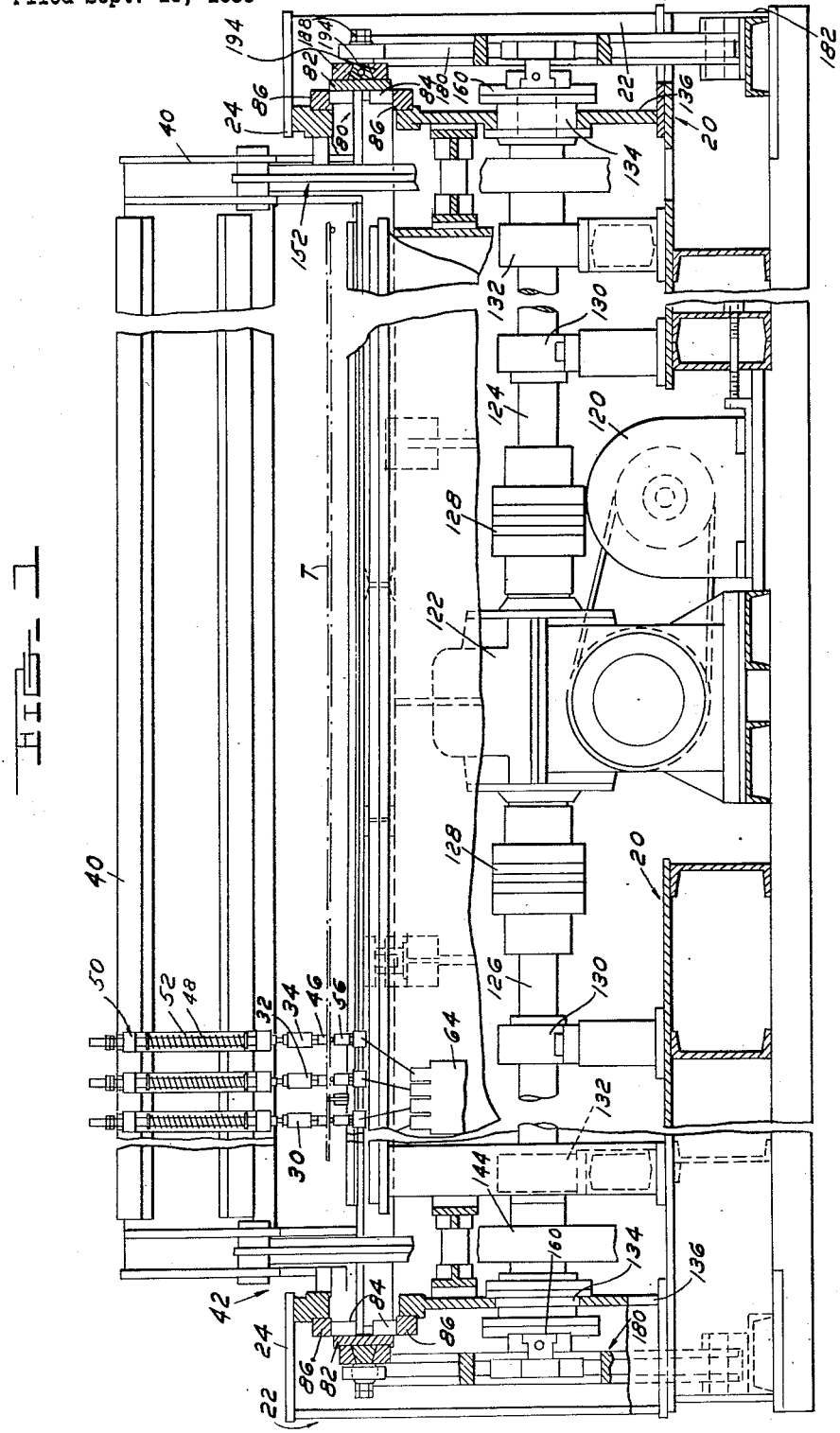

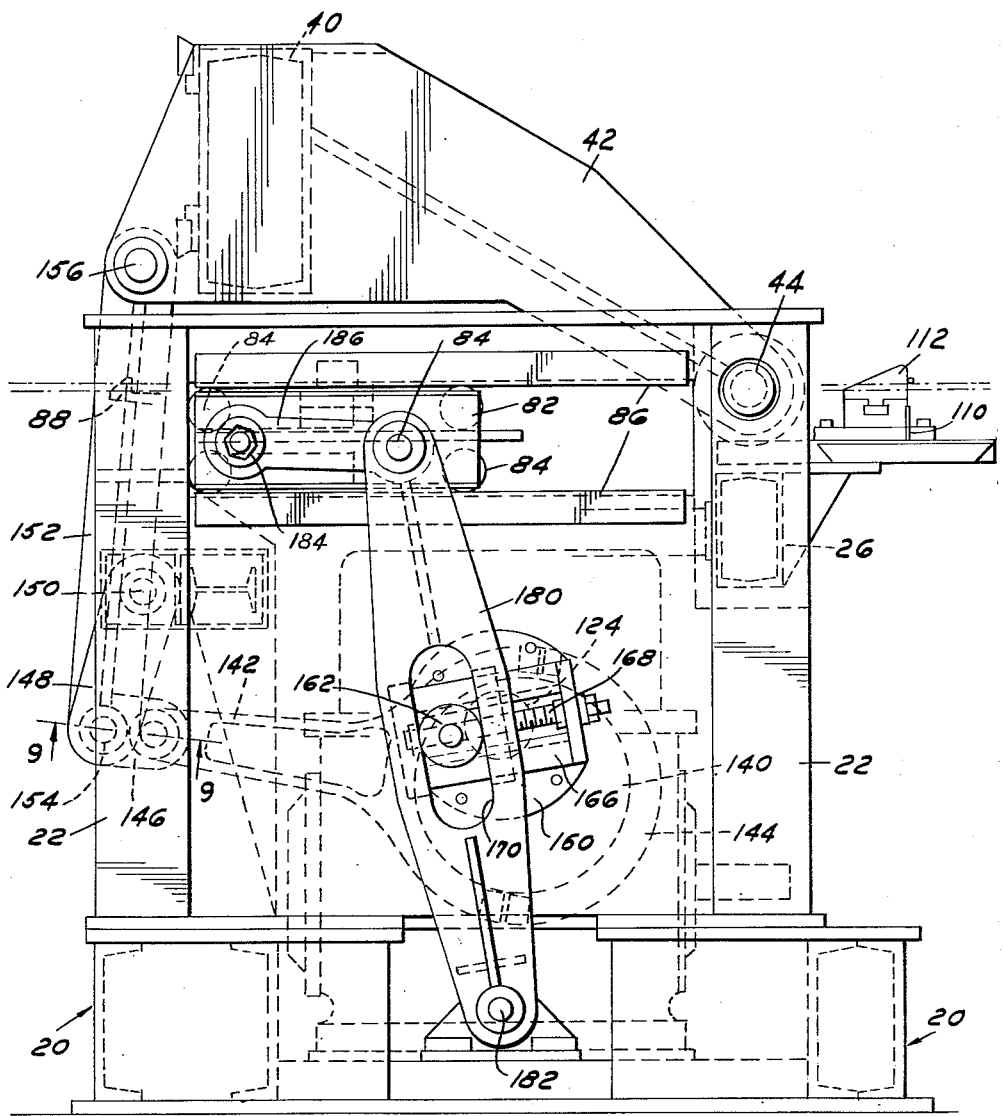

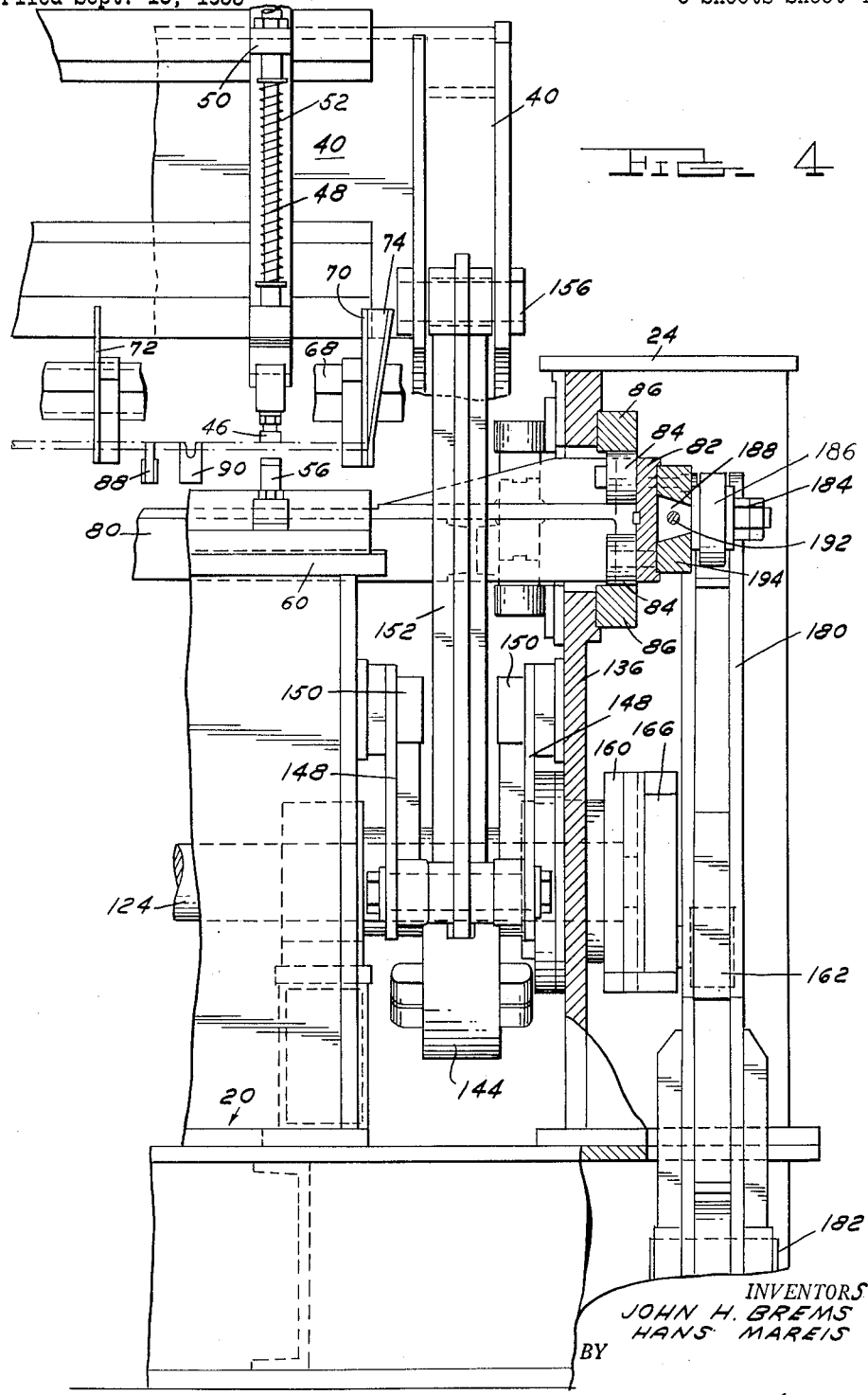

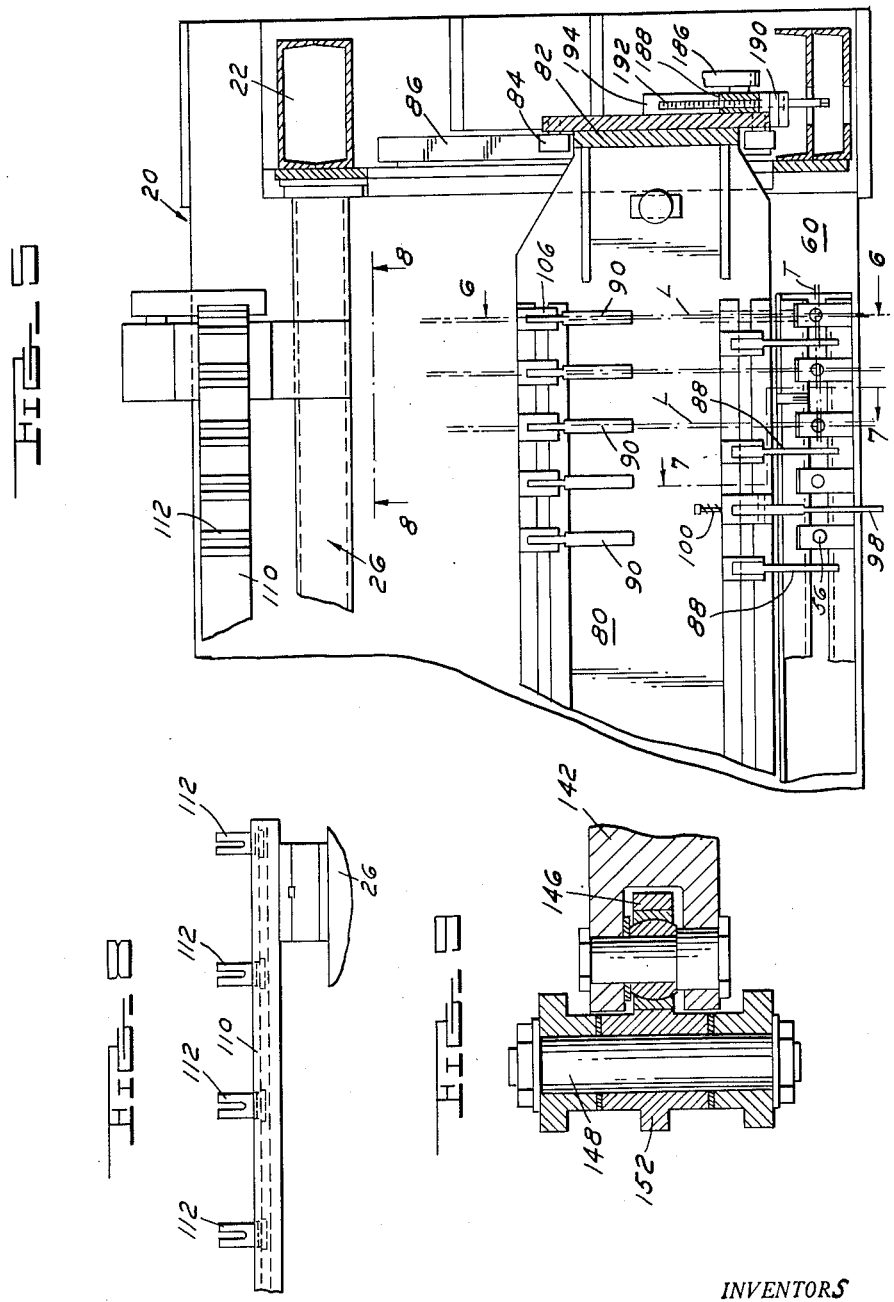

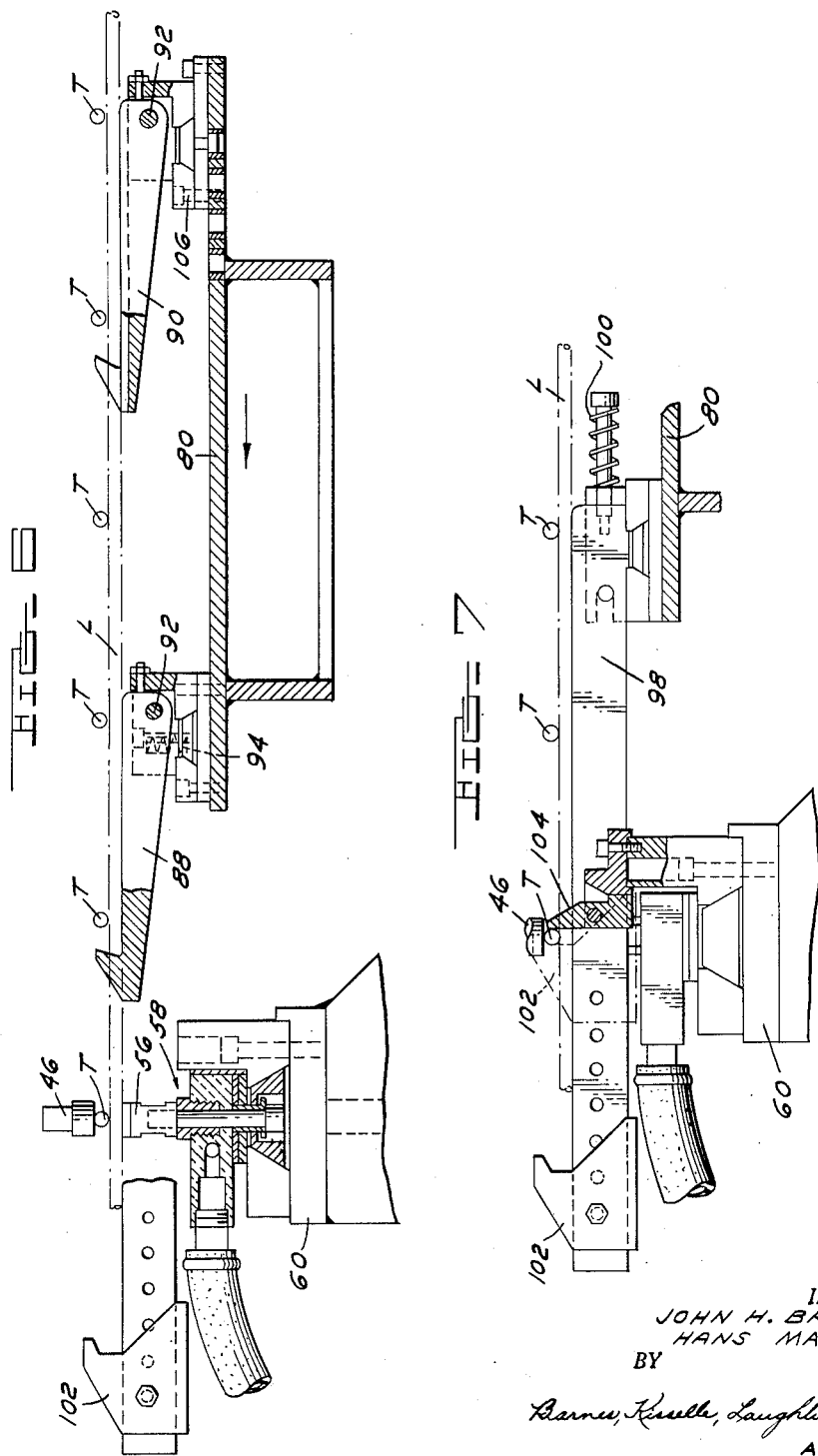

United States Patent Office 2,810,817
Patented Oct. 22, 1957

2,810,817

WIRE MESH WELDING MACHINE

John H. Brems and Hans Mareis, Detroit, Mich., assignors to Expert Die & Tool Company, Inc., Detroit, Mich., a corporation of Michigan Application September 15, 1955, Serial No. 534,512

13 Claims. (Cl. 219—87)

This invention relates to a wire mesh welding machine which automatically welds steel wire mesh at an extremely rapid rate.

It is an object of the machine to provide a means for spacing for width and length of the mesh, and it is a further object to provide a machine which can either be mounted in a stationary position or a portable position for use in creating wire mesh for road building and other reinforcing jobs.

It is an object of the invention to take reinforcing wire which can be provided in spools or coils and passing it through the machine to straighten it and weld it into mesh which can either be manufactured in defined sheets or manufactured continuously and rolled in suitable lengths for handling.

Under the present conditions of road building, the laborious method of assembling concrete reinforcing steel on the job requires too much time; and it is essential that the mesh be provided in greater quantity and in a more convenient form for rapid pouring of concrete. Even the furnishing of mesh in sheets requires a difficult handling problem and also a time-consuming fastening problem to prevent destruction of the effectiveness of the reinforcement.

It is an object, therefore, to provide a machine which can manufacture this mesh rapidly and in sufficient quantity to satisfy the increased demand resulting from the present road-building program.

Other objects and features of the invention will be apparent in the following detailed description and claims.

Drawings accompany the invention, and the various views thereof may be briefly described as:

Figure 1, an assembly elevation of the machine showing the relationship of the various parts, including the welding heads.

Figure 2, an end view elevation illustrating especially the feed mechanism.

Figure 3, a sectional view showing the details of the welding and feed mechanism.

Figure 4, a detailed elevation of one end of the machine showing the relationship of the operating parts.

Figure 5, a plan view of one end of the machine showing particularly the wire guides and feed fingers.

Figure 6, a sectional view on line 6—6 of Figure 5.

Figure 7, a sectional view on line 7—7 of Figure 5.

Figure 8, a sectional view on line 8—8 of Figure 5.

Figure 9, a sectional view on line 9—9 of Figure 2.

Referring to the drawings, in Figures 1, 2 and 3, it will be seen that the machine is built on a base frame or bed 20 which has upright corner members 22 at each end connected by top plates 24 laterally of the machine and connected by a suitable structural member 26 at the rear of the machine between the end portions. Various other structural elements are provided to furnish sufficient strength for the frame.

Basically, the machine consists of a bank of identical welding fixtures arranged lengthwise in the machine with a common head which actuates them all simultaneously, and the second main actuation of the machine comprises a feed mechanism which acts on the web as it is welded to move it through the machine. Longitudinal strands of the web are fed in parallel relation and transversely of the machine. Transverse strands are fed lengthwise of the machine adjacent the welding stations, where they are moved into welding position and then moved on as a part of the finished web after the welding operation.

The machine to be presently described handles heavy gauge wire up to about three-eighths of an inch, and the machine itself is intended to have forty welding fixtures operating from a plurality of transformers, ten in number, disposed along the front of the machine. In Figure 1, three of the welding fixtures 30, 32 and 34 are mounted on a large beam 40 extending lengthwise of the machine.

The beam 40 is mounted on two arms 42 pivoted at 44 at the back of the machine. The fixtures 30, 32 and 34 form the upper electrodes 46 of the welding jaws, these electrodes 46 being mounted on a rod 48 which is slidably positioned in a bracket 50 and urged downwardly by a spring 52. Suitable electric connections and cooling connections are provided for the electrodes. The bottom electrode of the welding jaws is shown in detail in Figure 6, where the lower electrodes 56 are mounted in an assembly 58 which provides the necessary electrical and cooling connections, the assembly being mounted on a bar plate 60 extending along the forward or feed side of the machine. The bar plate 60 is mounted on a front plate 62, which in turn is supported by the bed 20, and on the front plate 62 are mounted the transformers 64 which have suitable electrical connections to the lower welding heads 56.

Mounted at the forward face of the machine ahead of the electrode jaws is a rectangular rail 68 supported on brackets fastened to the ends of the machine with the sides of the rail at 45 degrees to horizontal. This rail supports guide plates 70 at the ends of the machine to feed in the cross wires to the welding station. Additional plates 72 spaced along the machine serve also as guides to feed cross wires delivered to the machine to a point where they are held at 73 in the hook of the holder plates. The end panels 74 of plate 70 tend to center the transverse strips relative to the machine. Also mounted on the bar 68 are guide eyes 76 for the wire which is being fed transversely of the machine.

Means must be provided to bring the transverse elements of the wire mesh into position between the electrodes of the welding jaws. A slide platform which extends lengthwise of the machine centrally of the top thereof is designated 80, and this platform is mounted to shift transversely of the machine by a moving mechanism which will be described later. The platform is mounted at each end on a cross head 82 suitably mounted by rollers 84 between tracks 86. On the slide platform are mounted spring-pressed dogs 88 and 90, each being pivoted at 92 and urged upwardly by a spring 94 shown in Figure 6. These dogs are spaced to catch transverse members of the welded mesh to pull the mesh through the machine.

In Figure 6, transverse members of the mesh are shown at T and longitudinal members are shown at L. As the table shifts to the rear, it will be seen that the mesh will be caught by the dogs 88 and 90 and moved rearwardly also. Fastened to the table 80 are drag arms 98 with a spring plunger connection 100 at the table to permit a slidable relationship at that end. At the other end of the drag arms are dogs 102 which serve to move a transverse member T into position between the electrode jaws to the welding position.

In Figure 7, in dotted lines, the dog 102 is shown holding a wire T in position against an upright dog 104 which is urged by a helical spring, not shown, to the vertical position of Figure 7. After the weld, when the mesh is pulled back by the dogs 88 and 90, the member T between the welding electrodes moves the dog 104 out of position against its spring locater. It will be seen that the dog 102 is adjustably positioned on drag bar 98, and this permits adjustment, depending on the different mesh that might be used in the machine. Similarly, the dog 90 at the rear of the table 80 is positioned on a dove-tailed slide 106 which can be shifted in suitable holes in the plate 80 to permit adjustment of the dog 90 to various positions to correspond with the mesh of the material being welded.

The dog 90 has a clevis formation on the top surface to receive the longitudinal wire L to help guide and support the mesh as it approaches the rear of the machine. On a stationary rail 110 at the rear of the machine are additional clevised guides 112 which serve to stabilize the mesh as it leaves the machine.

The moving parts of the machine, such as the welding beam 40 and the cross slide 80, are driven by a power source which originates with an electric motor 120, Figure 1, which drives a gear reduction unit 122, which in turn causes the rotation of twin shafts 124 and 126 connected to the transmission by suitable shock-absorbing coupling units 128. Shafts 124 and 126 are each journaled in bearings 130 and 132, and they extend from the center of the machine at the transmission 122 to the ends, where they are journaled at 134 in an end plate 136 which rests on the bottom frame 20 of the machine. Mounted on shaft 124 between the bearings 134 and 132 is an eccentric wheel 140 which co-operates with a throw arm 142 having a rim 144 which surrounds the eccentric wheel 140. Suitable bearing material, not shown, is interposed between the wheel 140 and the rim 144. The forward end of the throw arm 142 is pivotally connected to one leg 146 of a bell crank lever, the other leg 148 being pivoted to the frame at 150. A link 152 is connected at the elbow of the pivoted bell crank lever 146—148 at 154 and at the top end at 156 to the forward end of the welding beam 40, on which is mounted the upper jaws of the welding electrodes.

It will thus be seen that a forward throw of the throw arm 142 will cause the link 152 to rise as the bell crank lever 148 pivots about the point 150. As the eccentric wheel completes its cycle, the bell crank will be brought down and the link 152 will likewise come down to bring the upper jaws of the electrodes into welding position, the entire electrode beam 40 pivoting about the point 44 on the arm 42. In the position shown in Figure 2, the weld has just been completed, and the eccentric arm 142 is moving to the left to lift the welding beam 40.

The indexing cross slide plate or table 80 is also shifted back and forth by the rotation of the shaft 124—126. On the end of each shaft is mounted a wheel 160, and eccentrically mounted on the wheel with respect to the shaft 124 (see Figure 4) is a roller 162, the eccentricity of which can be adjusted relative to the shaft 124 by a frame mount 166. Adjustment screw 168 in the frame 166 permits adjustment of the roller 162 relative to the center of the shaft 124. The roller 162 is positioned to move in an elongate slot 170 in an arm 180, pivoted at 182 to the bottom frame, and pivoted at 184 to a link 186 fastened to the end 82 of the slide frame 80 (see Figures 1, 2 and 4) which is mounted on the rollers 84 between slides 86. With this construction, at each end of the machine the rotation of the shafts 124 and 126 will cause the feed slide 80 to shift back and forth. An adjustment connection in the form of blocks 188 and 190 is provided with an adjustment screw 192 (Figure 5) to regulate the position of arm 180 relative to slide plate 80. Block 188 slides between bars 194 in the adjustment.

As shown in Figure 2, the slide 80 is near its extreme left position ready to move to the right to pick up the mesh and shift it to the right, making it ready for another weld. If the mesh of the weld is changed, the stroke of the lever 180 may be varied by shifting the position of the roller 162 relative to the center of the shaft 124. Thus, the parts are synchronized such that immediately following a weld cycle the mesh will be moved by the table 80, which carries the dogs 88 and 90. The clevis guides 112 are shaped to hold the formed mesh against backward movement as the pull dogs 88 and 90 retract. As the table moves to the right, as viewed in Figure 2, it brings forward the locater dogs 102, Figures 6 and 7, to move a newly fed unwelded rod into position between the electrodes. During the welding cycle, there is sufficient hold time afforded by the lost motion of the eccentric arm 142 as it moves over center.

The top welding electrodes are spring loaded to insure positive contact and still permit motion of the cross beam 40 mechanically. During the welding cycle, the arm 180 and slide 80 are moving to the left toward a pickup position. When cross-head or beam 40 is full down, the eccentric wheel 140 is passing through a dead-center position with respect to throw arm 142, thus holding beam 40 down for a sufficient time to allow the weld to cycle and release. Subsequently, the dogs 88 and 90 pick up the mesh to shift it rearwardly.

In practice it is preferred to have the cross beam or cross-head 40 about 90° out of phase with the slide or index table 80. For example, when the cross-head 40 is down in welding position with springs 52 compressed, the index table 80 with its dogs 88 and 90 is half-way back in its left-ward motion toward its pick-up position. After the weld, when the cross-head 40 has moved half-way up, the index table 80 is full to the left (see Figure 2) ready to pick up and index the mesh to the right. Likewise, when the cross-head 40 is in full "up" position, the index table is half-way to the right in its stroke, and when the cross-head 40 has moved half-way toward weld position the index table or slide 80 is all the way to the right.

We claim:

1. In a machine for manufacturing continuously a mesh for concrete reinforcement, a frame, a plurality of welding electrode jaws mounted in spaced relation on said frame, a swinging beam mounted on said frame above said jaws, a plurality of electrode jaws on said beam arranged to register with the jaws on said frame, a bell crank lever on said frame pivoted on an axis parallel with said beam, a link connecting the corner of said bell crank lever with said beam, means on said frame for supporting and shifting a mesh as it is formed comprising a slide frame mounted below said beam in substantially parallel relation thereto, said frame having a plurality of sets of pick-up dogs in spaced relation along the length of the frame, one of said sets at the entrance side of the machine being positioned to shift an individual bar into position between said welding electrodes, and another set of said dogs being positioned on the other side of said electrodes from said first set and being spring-pressed to a position to catch transverse bars of said mesh as they are welded and shift the same along with the formed mesh to the other side of the machine, means on said frame at the other side of the machine to engage a transverse bar of the mesh to block reverse movement of the mesh, and means for simultaneously operating said slide frame and for imparting an arcuate motion to said bell crank lever to raise and lower said beam, comprising a rotating shaft disposed lengthwise of said machine, means for rotating said shaft and eccentric means on said shaft connected to a throw-arm which transmits motion to said bell crank lever, and a second eccentric means connected to said shaft mechanically associated with a secondary lever arm fastened at one end to said frame and at the other end to said slide frame.

2. A machine for manufacturing continuously a mesh for reinforcement of concrete and the like which comprises, a frame, a plurality of sets of welding electrodes disposed along said frame, each comprising a stationary electrode and a movable electrode, a cross beam for mounting said movable electrodes, a cross slide on said frame for feeding cross members to said electrodes to a welding position and for shifting formed mesh through said machine, and means operable in a continuous motion to shift said cross beam and said cross slide in sequence to bring said electrodes to welding position and to move said slide and the formed mesh through the machine.

3. A device as defined in claim 2 in which the means for shifting the cross beam comprises, an eccentric wheel mounted for rotation on an axis substantially parallel to said beam, a throw arm having one end associated with said wheel, and linkage connecting said throw arm and said beam, wherein said beam is moved to welding position when said eccentric wheel is reaching and passing a dead-center position with respect to said throw arm, wherein sufficient welding time is provided while said beam is in its welding position.

4. A device as defined in claim 3 in which the means for moving the cross slide is operated simultaneously and in a phase relationship with said cross beam to cause shifting of completed mesh a predetermined time after the weld.

5. A device as defined in claim 2 in which the cross slide has one set of pick-up dogs on one side of said electrodes for moving a transverse mesh element into position under the electrodes and on the other side of the electrodes on said slide a plurality of pairs of dogs arranged in parallel lines adapted to engage fixed transverse members of said mesh to index the mesh to a new welding position as a loose member is moved to the electrodes.

6. A device as defined in claim 5 in which means is provided on the frame of said machine for guiding and aligning a loose transverse rod beneath the electrodes, said means including a plurality of spring-pressed fingers, each movable out of position against its holding spring in the direction of the finished mesh.

7. A device as defined in claim 2 in which a rail is mounted on one side of said frame substantially parallel with said electrodes carrying on the bottom thereof a plurality of regularly spaced guiding eyes for longitudinal members of a mesh and carrying on the top thereof a plurality of guide plates, including stop plates at each end for feeding a loose transverse rod for said mesh into position adjacent said electrodes, and a means at the other side of the frame from said rail comprising slotted dogs recessed centrally to receive longitudinal members of the mesh and cammed upwardly and abruptly downwardly from the machine to provide a locking means against retraction of the completed mesh.

8. A device as defined in claim 2 in which there is provided in the cross slide a plurality of pairs of spring-pressed dogs biased upwardly for engaging welded cross members of said mesh to index the mesh away from the welding electrodes, one dog of each pair having a longitudinal channel and a clevised hook member, wherein said one dog engages both longitudinal and transverse members of the mesh as it indexes the mesh.

9. Apparatus for continuously making welded wire fabric comprising, a frame, a plurality of first receiving means on said frame, said first receiving means being spaced apart laterally, each of said first receiving means being adapted to receive longitudinally an indefinite length of wire, a cross head pivotally mounted on said frame, a plurality of first electrodes on said cross head, a plurality of second electrodes on said frame, said first and second electrodes being arranged in pairs, said pairs being aligned with said first receiving means, second receiving means adapted to receive laterally a succession of pieces of wire having predetermined length, said second receiving means being arranged to deliver the lateral pieces of wire to a position adjacent the longitudinal lengths of wire and generally aligned with said pairs of electrodes, powered means operable to continuously swing said cross head reciprocably on said frame so that said pairs of electrodes are alternately brought into welding position and retracted position relatively to the wire to be welded, feed means operable to advance the wire longitudinally a predetermined distance when said cross head is swung away from said welding position, said powered means being operative to accelerate said cross head in a direction away from said welding position while said cross head is approaching the same so that said pairs of electrodes engage the wires to be welded with minimal velocity, whereby to minimize impact damage to said electrodes.

10. Apparatus for continuously making welded wire fabric comprising, a frame, a plurality of first receiving means on said frame, said first receiving means being spaced apart laterally, each of said first receiving means being adapted to receive longitudinally an indefinite length of wire, a cross head pivotally mounted on said frame, a plurality of first electrodes on said cross head, a plurality of second electrodes on said frame, said first and second electrodes being arranged in pairs, said pairs being aligned with said first receiving means, second receiving means adapted to receive laterally a succession of pieces of wire having predetermined length, said second receiving means being arranged to deliver the lateral pieces of wire to a position adjacent the longitudinal lengths of wire and generally aligned with said pairs of electrodes, powered means operable to continuously reciprocate said cross head in an advancing stroke and a retracting stroke for carrying said electrodes thereon alternately to a welding position and a retracted position relatively to the wire to be welded, feed means operable to advance the wire a predetermined distance when said cross head is swung away from said welding position, said powered means being operative to swing said cross head relatively rapidly in said advancing and retracting strokes whereby to shorten the time required for a welding cycle, said powered means being operative to accelerate said cross head in a direction away from said welding position while said cross head is in the terminal portion of its advancing stroke so that said pairs of electrodes engage the wires to be welded with minimal velocity, whereby to minimize impact damage to said electrodes.

11. The apparatus defined in claim 10 wherein said powered means is connected to said cross head at a location opposite said first electrodes from the pivotal mount of said cross head to increase the force with which said electrodes clamp the wires to be welded while in said welding position.

12. The apparatus defined in claim 10 wherein said frame and cross head extend generally horizontally, said electrodes are disposed in generally vertical relation in said welding position, and the pivotal mount of said cross head is disposed generally in the horizontal plane of said electrodes in said welding position.

13. The apparatus defined in claim 12 wherein said first receiving means is operative to guide the longitudinal wires in a generally horizontal direction into welding position and said second receiving means delivers the lateral wires gravitationally to welding position.

References Cited in the file of this patent

UNITED STATES PATENTS

| | | |
|---|---|---|
| 1,984,742 | Hauck | Dec. 18, 1934 |
| 2,422,829 | Fotie | June 24, 1947 |